US009357788B2

(12) United States Patent
Mesa-Escuderos

(10) Patent No.: US 9,357,788 B2
(45) Date of Patent: Jun. 7, 2016

(54) AUTOMATIC ROTARY MACHINE FOR THE PRODUCTION OF EMPANADAS

(71) Applicant: Carlos Leon Mesa-Escuderos, Manizalez (CO)

(72) Inventor: Carlos Leon Mesa-Escuderos, Manizalez (CO)

( * ) Notice: Subject to any disclaimer, the term of this patent is extended or adjusted under 35 U.S.C. 154(b) by 0 days.

(21) Appl. No.: 14/368,509

(22) PCT Filed: May 29, 2013

(86) PCT No.: PCT/IB2013/000730
§ 371 (c)(1),
(2) Date: Jun. 25, 2014

(87) PCT Pub. No.: WO2013/179108
PCT Pub. Date: Dec. 5, 2013

(65) Prior Publication Data
US 2015/0079243 A1    Mar. 19, 2015

(30) Foreign Application Priority Data
May 29, 2012    (CO) .................................. 12-088978

(51) Int. Cl.
*A21C 9/06*        (2006.01)
*A21D 6/00*        (2006.01)
(52) U.S. Cl.
CPC .. *A21C 9/063* (2013.01); *A21D 6/00* (2013.01)

(58) Field of Classification Search
CPC .................................. A21D 6/00; A21C 9/063
See application file for complete search history.

(56) References Cited

U.S. PATENT DOCUMENTS

| 4,332,538 | A | * | 6/1982 | Campbell | ................ | A21C 5/00 264/148 |
| 4,424,236 | A | * | 1/1984 | Campbell | ................ | A21C 5/00 426/231 |
| 4,960,601 | A | * | 10/1990 | Cummins | ................ | A21C 3/04 366/85 |
| 5,012,726 | A | * | 5/1991 | Fehr | ........................ | A21C 9/063 99/450.6 |
| 5,731,022 | A | * | 3/1998 | Cummins | ................ | A21D 6/00 222/55 |
| 6,558,720 | B1 | * | 5/2003 | Karner | .................... | A21C 9/063 426/138 |
| 2003/0159596 | A1 | * | 8/2003 | Tuyls | ........................ | A21C 9/04 99/468 |
| 2012/0219674 | A1 | * | 8/2012 | Lee | ........................ | A21C 9/063 426/283 |

* cited by examiner

*Primary Examiner* — Jianying Atkisson
(74) *Attorney, Agent, or Firm* — Luis Figarella

(57) ABSTRACT

The invention relates to an automatic rotary machine for the production of empanadas, comprising a circular rotary plate on which the empanadas are produced, actuated by a motor reducer and with pneumatic, hydraulic or other type means in the different production phases, such as dough metering, flattening, filling metering, molding, flattening and cutting. The invention includes a dough flattening disk and a folding system comprising two retractable half-moons actuated by pivot levers.

6 Claims, 8 Drawing Sheets

AUTOMATIC ROTARY MACHINE FOR THE PRODUCTION OF EMPANADAS

PRIOR ART OF THE INVENTION

Empanadas are mixtures of different foods which, usually have a coating of dough made from flour, with fillings of meat, vegetables and other compounds that make them a good meal replacement. Empanadas are manufactured in different ways and forms using different techniques, most conventional being processed manually, through kneading cornmeal or wheat flour and then flattening them with rollers made of wood, placing the flattened dough mass and then placing within the center portion a filling of pre-cooked and seasoned (usually with meats or vegetables) and covering with the dough wherein surplus dough is removed or cut either by hand or with the help of a semi-circular shaped vessel.

Although made everywhere, empanadas are typically made by hand, resulting in empanadas of varying sizes, using too much time hand kneading the flour, forming, molding and closing. There have been a number of machines designed to make, empanadas, including AR 204790, AR 031737 and AR 19750261219. Others have a roller that moves automatically leaving the dough attached to the workbench. There have been suggestions in the art for the use of rollers which rotate automatically dies for cutting, although when used manually these do not significantly reduce the preparation time or increases the quality of the product.

OBJECT OF THE INVENTION

It is an object of the invention for the automatic rotary machine for making empanadas to allow continuous serial mass production while providing high quality standards.

It is another important object of the invention for the rotary automatic machine for making empanadas to reduce empanada production time without the need of excessive movements that fatigue operators or generate occupational health risks.

An equally important object for the automatic rotary machine for making empanadas is to have aseptic and hygienic materials in its construction and have since no personal handling of the empanadas takes place, to make the production of empanadas that are free of particulates and pollutants.

At the same another object of the invention for the automatic rotary machine for making empanadas is to require a minimum of labor during their production.

BRIEF DESCRIPTION OF THE FIGURES

To clarify the invention and its advantages compared to the known art, we describe below with the aid of the accompanying drawings, different forms of illustrative embodiments and not limiting the application of these principles.

DESCRIPTION OF THE INVENTION WITH RESPECT TO THE FIGURES

Figure 1:
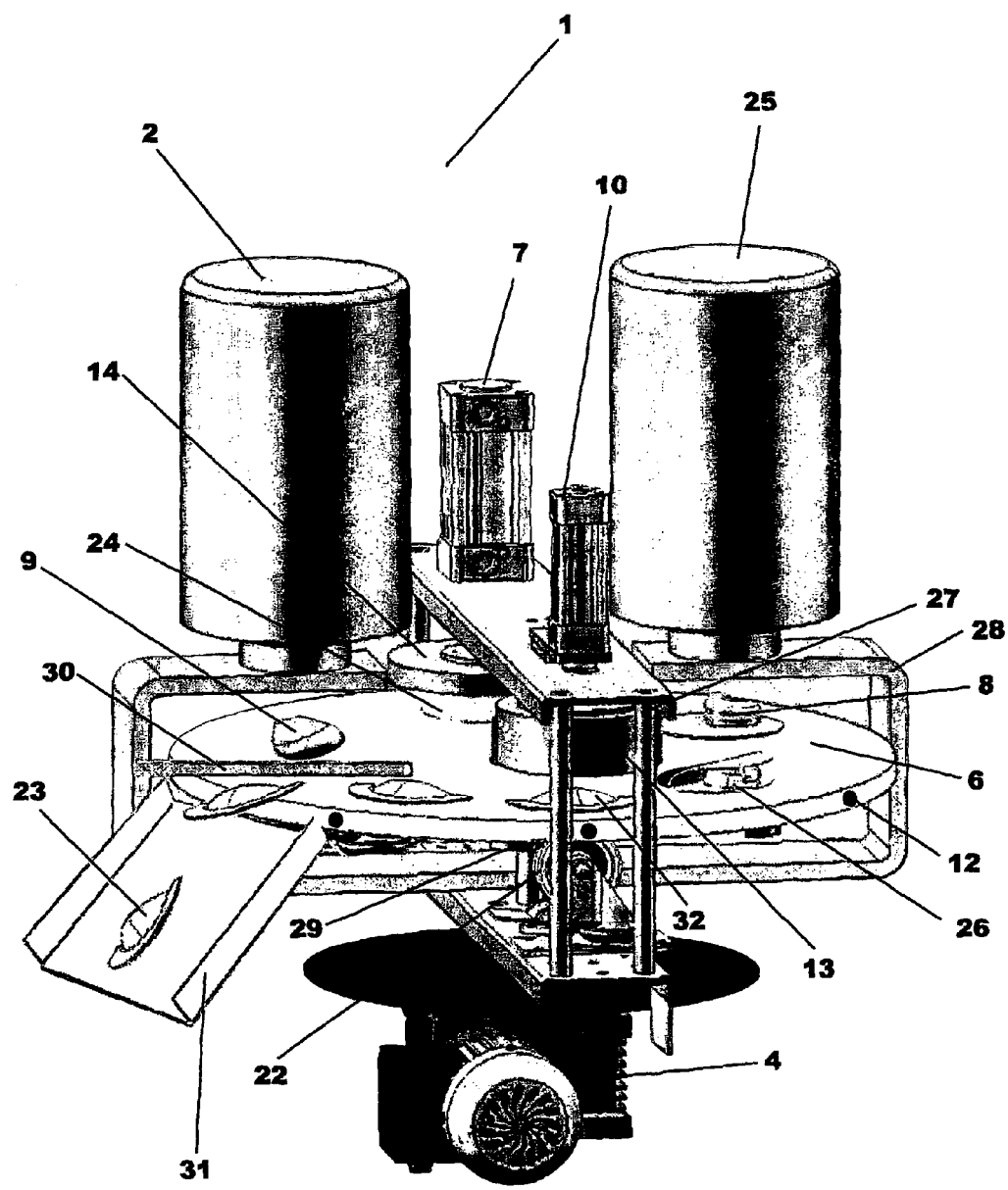
FIG. 1 shows a perspective view of the automatic rotary machine and its various processing areas.

This invention relates to an, automatic rotary machine for the automatic manufacture of empanadas and similar pies characterized in its entirety through a rotating six-step process having six stations wherein in the first step the dough 9 is metered and deposited by a metering plunger 2 activated by a mechanical system of the screw and/or fastener 3 and/or a pneumatic and/or hydraulic piston which is powered by a geared motor or dispenser gear actuator 5 under Programmable Logic Control (PLC) control, wherein the dough passes to a near flattening station in which a pneumatic and/or hydraulic piston 7 activating a flattening mold disc 14 flattens 24 the dough 9 into a circular plate working area within the turntable 6 which is actuated through a reduction gear 4 by the PLC which then moves the turntable through the reduction gear 4 under PLC control and then moves the dough to the area where there is a pneumatic and/or hydraulic piston. Once in the flattener, the actuator 7 (piston and/or worm gear system) flattens the dough 9 through the use of a flattening disc 14 and moves the flattened dough 24 to the area where the filling 8 is deposited by means of an empanada filling feeder or dispenser 25 actuated by a mechanical system screw and/or rack 3 which is powered by another gear motor 5 and/or a plunger tire and/or pneumatically controlled by the same PLC to pass the dough to the folding system station 26 position of the flattened dough body 24 with filling 8 inside which is folded by means of retractable crescent molds 15 folding it into two parts at ninety degrees to each other, which lifts half of the flattened dough 24 deposited above the filling 8 by a system located below the folding area 26 of booster rod 18 which is pivoted on the shaft 20 within the bearing pivot 19 when they reach the area of folding, these booster rods 18 colliding with one of its ends against a fixed shaft 33 attached to such structure of the machine and refrain pushing closer rods 16 to push the crescents mold 15 that joints universal movement 17 and patella kit 34 up and folded and returned by the action of spring 37 and then move to the area of modeling, closure and cutting of excess dough by the mold closure and cut 3 driven by a pneumatic and/or hydraulic piston 10 and/or worm pinion engaging in a rack 3 controlled by the PLC 21, and the completed empanadas 23 continue to rotate on the turntable 6 to eject at the last station where a static diverting arm 30 addressed by the nozzle 31 to a conveyor or packing containers.

Referring in detail to the drawings, looking at FIG. 1 we see an automatic revolving machine for making empanadas 1 with different steps for the automatic construction of an empanada located areas where we see the turntable 6, with a dough dispenser 2 where the deposited dough 9 enters the area where dough is flattened 24 on the disc 14 driven by a pneumatic and/or hydraulic piston 7. This flattener dough 24 is then taken to the area for deposit of filling 8 where the empanada filling dispenser 25 passes on to the folding zone 26 and then continue the tour coming to the area where the diverter arm 30 ejects the finished empanada 9 to the area of further conveyor belts and/or storage containers for packaging.

Figure 2:
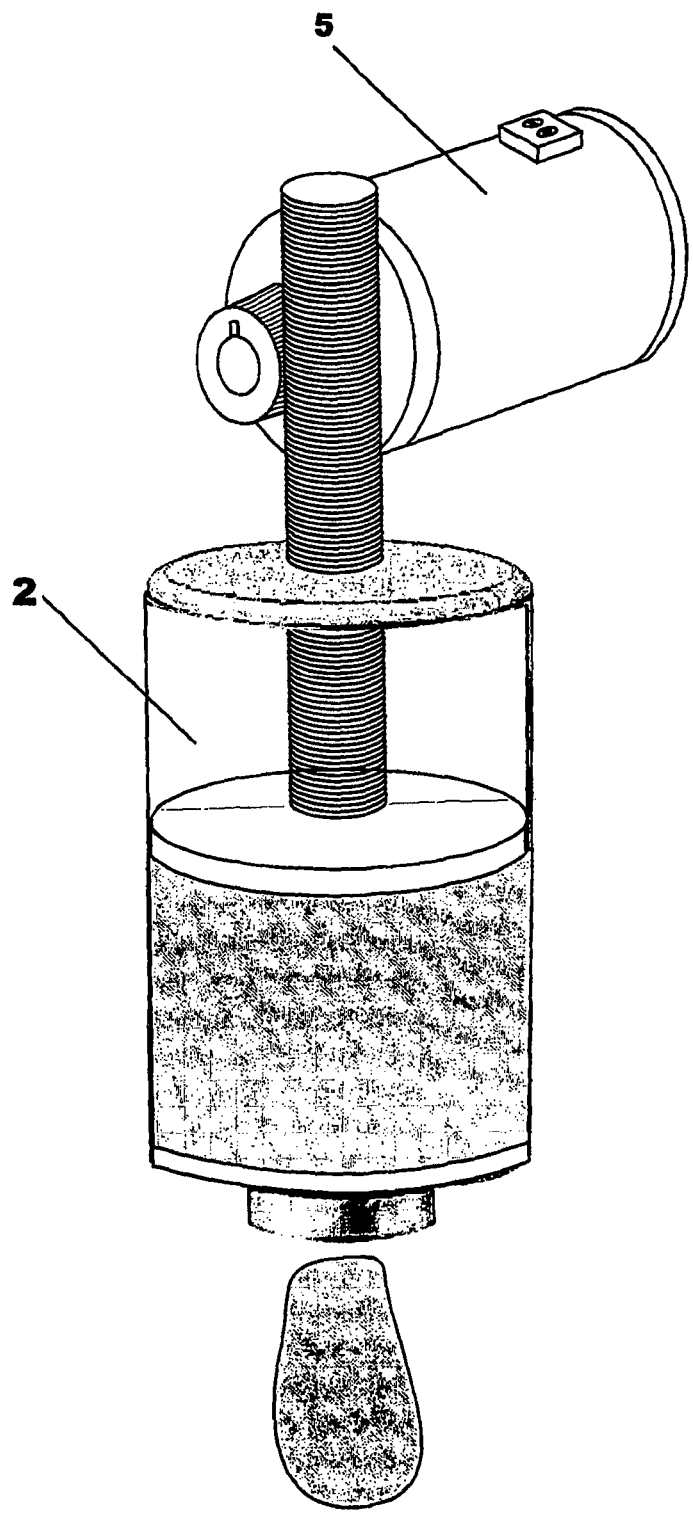
FIG. 2 shows a side view of the dough dispenser body and/or filling dispenser for the automatic machine for making empanadas.

In FIG. 2 we show the dispensing system for either dough and/or dough filling activated by a pinion and/or auger and/or rack 3 with the dough dispenser or container 2.

Figure 3:
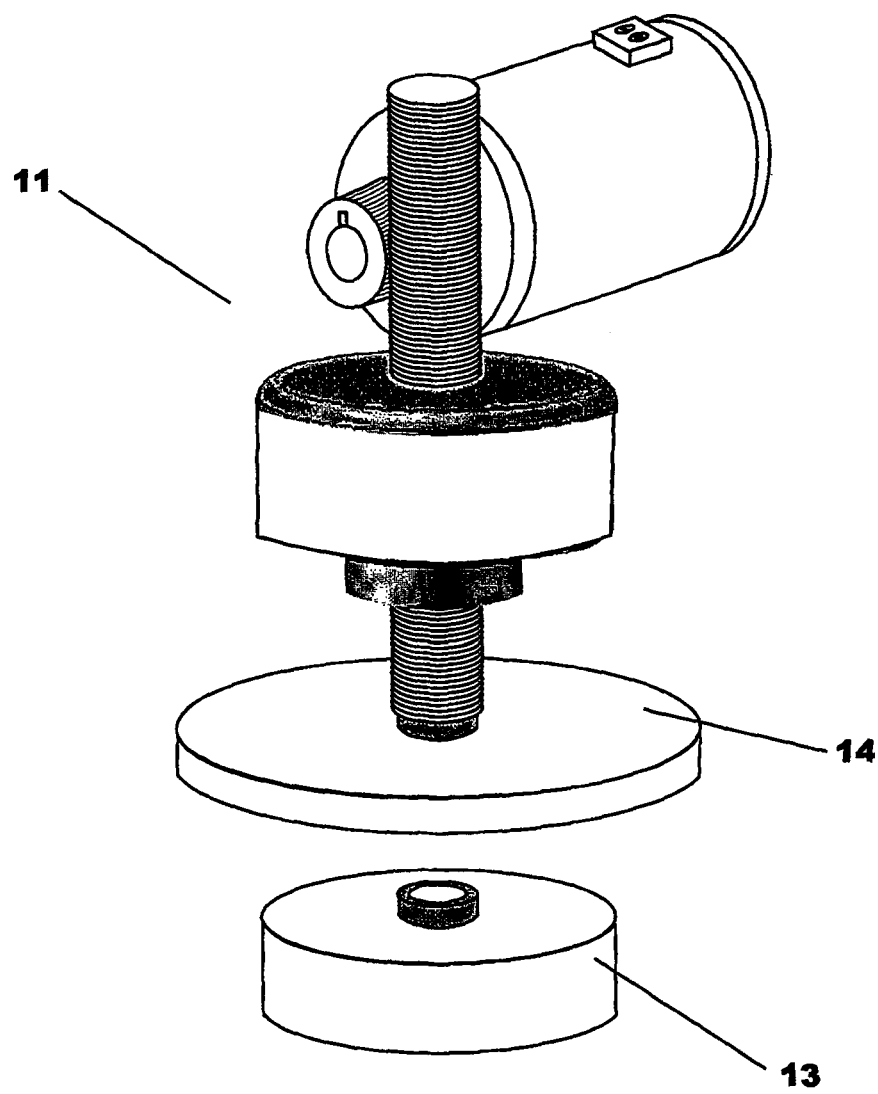
FIG. 3 shows a side view of the dough modeler, closer and cutter for the automatic machine for making empanadas.

In FIG. 3 we show the flattening system with a flat disc 14 and/or mold for closing and cutting 13 driven by a rack, auger and/or rack 3.

Figure 4:
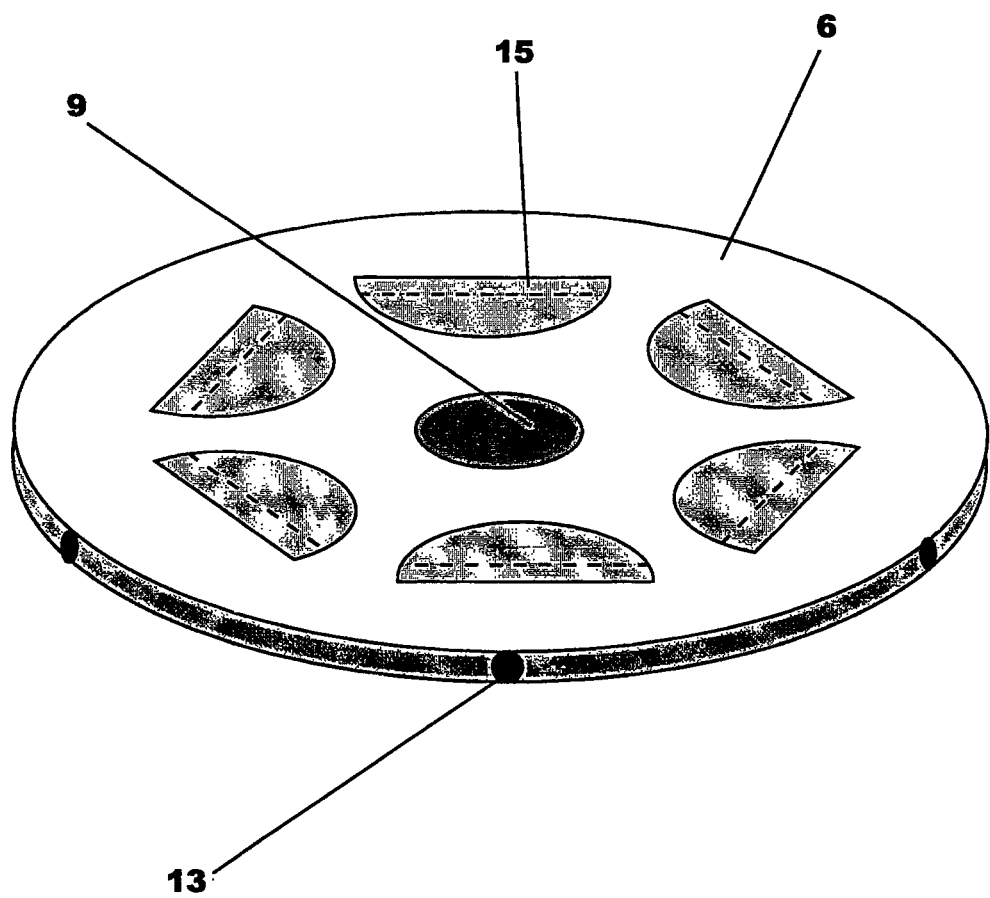
FIG. 4 shows a perspective view of the turntable and the six stations for the different steps of empanada assembly; laminator and/or modeler, dough enclosing and cutting for the automatic machine for making empanadas.

In FIG. 4 we see the turntable 6 with its central support axis 29 which hold the different steps for assembling the empanadas with crescent molds 15 retractable 15 and sensors 12 which give the signal to the PLC for dosing, flattening, molding, sealing and cutting.

Figure 5:
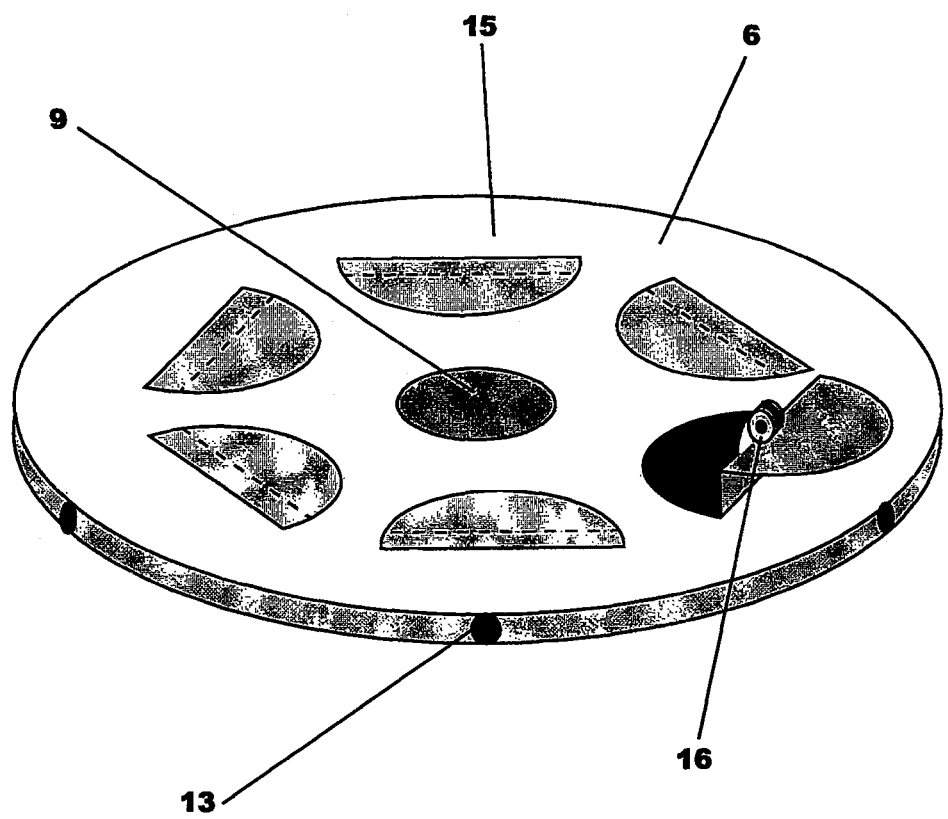
FIG. 5 shows a perspective view showing the dough folding process station system activated.

FIG. 5 shows the turntable 6 with the crescent mold 15 at the folding area, actuated by the closer rod 16 with the core or support axle 29 and the sensors 12.

Figure 6:
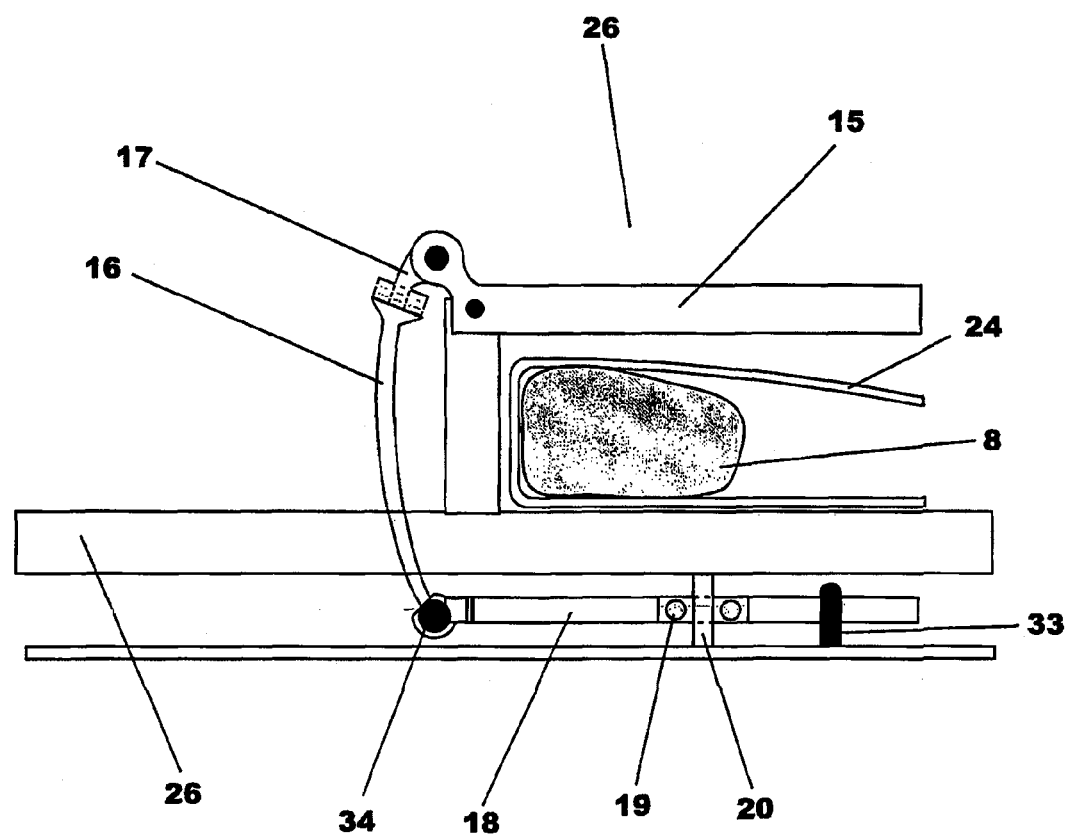
FIG. 6 shows a side sectional view of the dough folding system.

FIG. 6 shows a lateral section of the empanada folding system 26 the crescent 15 which is retractable and is folded into two sections each ninety degrees by the action of the booster rod 18 pivoted to the fixed shaft 20 with its bearing pivot 19 by activating the connecting closer rod 16 by means of the patella 34 and universal movement 17 articulating parts of the crescent colliding booster rods 18 of crescent when it collides with the fixed shaft 33 to the structure of the folding machine on the flattened dough 24 filling 8 making it ready to become patterned, closed and cut surplus.

Figure 7:
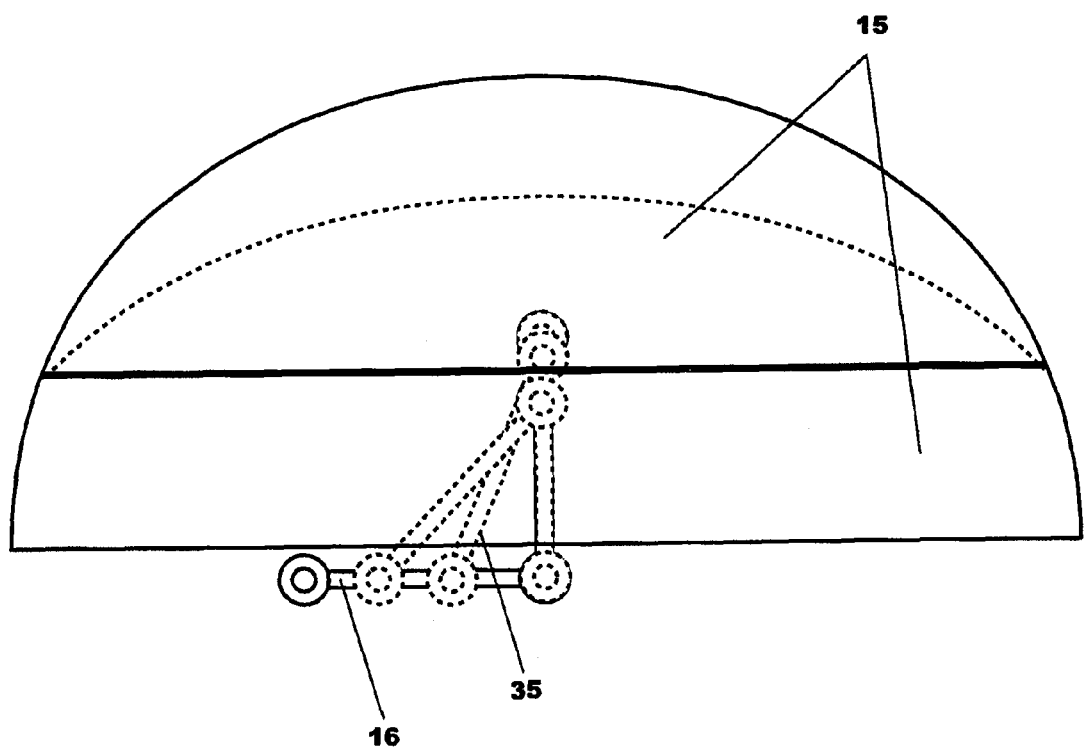
FIG. 7 shows a rear view of the dough folding system when activated.

FIG. 7 shows the rear of the crescent mold 15 sequence in 35 of the closer rod 16 located horizontally in the process to remain upright folding retractable Crescent by the push booster rod 18.

Figure 8:
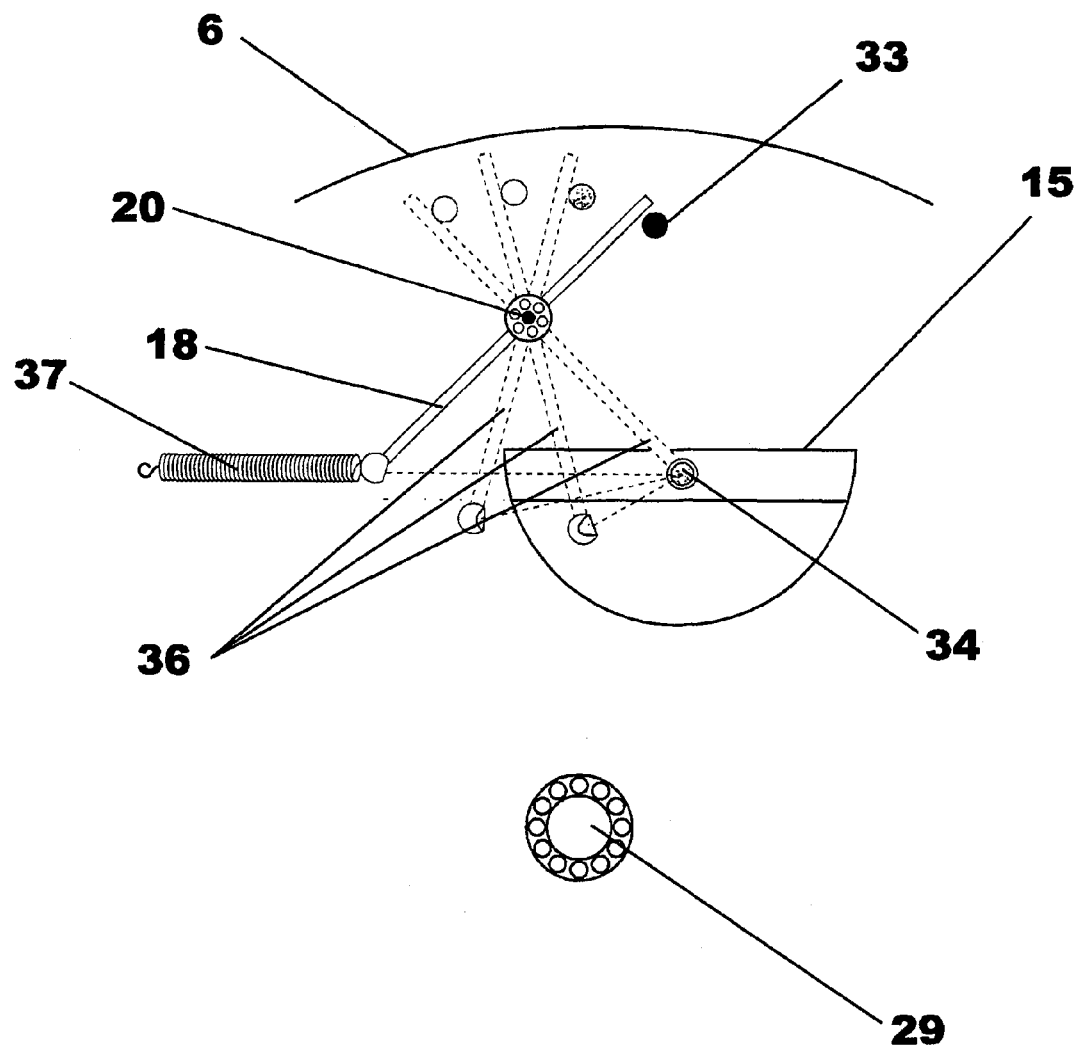
FIG. 8 shows a bottom view of the dough folding system when activated when activated.

FIG. 8 shows the sequence 36 of the movements as the rod 18 pushes the connecting rod 16 which lifts the retractable crescent 15 by the action of the connecting rod 18 pivots about its shaft or axis 20 when it collides with the fixed shaft 33 anchored to the structure of the machine and back to your site once it has been fixed shaft 33 by the action of spring 37.

CHECKLIST

Rotary Machine for Making Empanadas and Empanada
1—Automatic empanada machine
2—Dough dispenser, screw activated
3—Auger and/or zipper dough dispenser 2
4—PLC controlled gears
5—Dispenser 2 gear actuator
6—Turntable
7—Pneumatic Piston for flatterer
8—Empanada Filling
9—Dough
10—Pneumatic Piston to power the mold and cut die
11—Piston with bladed auger for cutting or flattening
12—PLC Sensors
13—Mold for cutting and closing
14—Flattening Disc Mold
15—Retractable crescent mold
16—Closer Rod for pushing retractable crescent mold
17—Universal movement closer
18—Booster Rod for pushing closer rod 16
19—Pivot point for booster rod 18
20—Shaft where, booster rod 18 pivots
21—PLC
22—Wheels that help support areas for flattening and cut molding
23—Finished empanada
24—Flattened dough
25—Empanada filling dispenser
26—Dough folding station
27—Pillars to support flattened, patterned and cut pneumatic pistons
28—Pillars to support the dough and filling dispensers
29—Turntable support axle
30—Diverting arm for finished empanada 23 transport to slide 31
31—Finished empanada slide 31
32—Empanada in the molding and excess cutoff process
33—Fixed shaft which activates the dough folding system
34—Patella Kit which connects the two cranks dough folding, systems
35—Sequence of movements of the closer rod 16 walking, up and makes double average retractable crescent mold 15 when pushed by the booster rod 18.
36—Sequence of the movement of the connecting booster rod 18 pivoted and pushing the closer rod 16 so the patella kit 34 pushes and bends the crescent mold 15 through the universal closer movement 17.
37—Spring which unfolds the retractable crescent, returning the booster rod 18 when the fixed shaft 33 passes the folding system.

The invention claimed is:

1. An empanada manufacturing system comprising;
one or more programmable logic control (PLC) units sensing and activating the motion of one or more of the following system actuators, including;
a rotary turntable controlled by one of said one or more PLC units' and powered by a motor through gears, said rotary turntable having the following elements placed over its surface along its length;
a programmable dough dispenser capable of metering and depositing said dough on said turntable surface through a controllable dispensing actuator;
a programmable dough flattener comprised of a up/down actuator having a distal flat mold controllable dough flattening actuator;
a programmable empanada filling dispenser capable of metering and depositing a programmable amount of empanada filler on said flattened dough through a controllable dispensing actuator;
a programmable dough folder comprised of a folding crescent having a controllable folding actuator;
a programmable empanada cutting and closing mechanism comprised of an up/down actuator having a distal cutting and closing mold forming a controllable cutting and closing mold actuator; and
a finished empanada diverting arm.

2. The system of claim 1 wherein;
said dough flattering up/down actuator is comprised of one of: a hydraulic piston, a pneumatic piston, worm gear, pinion or rack;
said cutting and closing up/down actuator is comprised of one of: a hydraulic piston, a pneumatic piston, auger, worm gear, pinion, zipper or rack;
each said actuator for dough dispensing, up/down dough flattening, empanada filling, dough folding as well as up/down cutting and closing molding is adjustable according to the raw material from which the dough is made.

3. The system of claim 2 wherein;
at least one of each said actuator for dough dispensing, dough flattening, empanada filling, dough folding as well as cutting and closing molding is under said one or more PLC units' control.

4. An empanada manufacturing system comprising;

one or more programmable logic control (PLC) units sensing and activating the motion of one or more of the following system actuators, including;

a rotary turntable controlled by one of said one or more PLC units' and powered by a motor, said rotary turntable having the following elements placed over its surface along its length in the following order;

a manual dough placement area;

a programmable dough flattener comprised of a up/down actuator having a distal flat mold controllable dough flattening actuator;

a manual empanada filler placement area;

a programmable dough folder comprised of a folding crescent having a controllable folding actuator;

a programmable empanada cutting and closing mechanism comprised of an up/down actuator having a distal cutting and closing mold forming a controllable cutting and closing mold actuator; and a finished empanada diverting arm.

5. The system of claim 4 wherein;

said dough flattering up/down actuator is comprised of one of: a hydraulic piston, a pneumatic piston, worm gear, pinion or rack;

said cutting and closing up/down actuator is comprised of one of: a hydraulic piston, a pneumatic piston, auger, worm gear, pinion, zipper or rack;

each said actuator for up/down dough flattening, dough folding, as well as up/down cutting and closing molding is adjustable according to the raw material from which the dough is made.

6. The system of claim 5 wherein;

at least one of each said actuator for dough flattening, dough folding as well as cutting and closing molding is under said one or more PLC units' control.

* * * * *